(12) United States Patent
Yeo

(10) Patent No.: US 7,149,179 B2
(45) Date of Patent: *Dec. 12, 2006

(54) OPTICAL DISC HAVING VARIABLE SPARE AREA RATES AND METHOD FOR VARIABLY SETTING THE RATE OF SPARE AREAS IN THE OPTICAL DISC

(75) Inventor: Woon-Seong Yeo, Cheongju-si (KR)

(73) Assignee: LG Electronics Inc., Seoul (KR)

( * ) Notice: Subject to any disclaimer, the term of this patent is extended or adjusted under 35 U.S.C. 154(b) by 80 days.

This patent is subject to a terminal disclaimer.

(21) Appl. No.: 10/990,531

(22) Filed: Nov. 18, 2004

(65) Prior Publication Data

US 2005/0068877 A1  Mar. 31, 2005

Related U.S. Application Data

(63) Continuation of application No. 09/055,240, filed on Apr. 6, 1998.

(30) Foreign Application Priority Data

May 21, 1997  (KR) .................................... 97-19695

(51) Int. Cl.
*G11B 7/24* (2006.01)
(52) U.S. Cl. ................. 369/275.3; 369/47.14; 369/53.2
(58) Field of Classification Search ............. 369/275.3, 369/275.4, 275.1, 59.25, 53.2, 53.15, 53.17, 369/47.14, 53.36, 47.49, 53.29, 53.13, 30.07; 714/710; 360/48, 72.1
See application file for complete search history.

(56) References Cited

U.S. PATENT DOCUMENTS 5,111,444 A  5/1992  Fukushima et al.
5,235,585 A  8/1993  Bish et al.
5,271,018 A  12/1993  Chan
5,319,626 A  6/1994  Ozaki et al.
5,715,221 A  2/1998  Ito et al.
5,809,201 A  9/1998  Nagasawa (Continued)

FOREIGN PATENT DOCUMENTS

EP          0350920       1/1990

(Continued)

OTHER PUBLICATIONS

Standard ECMA-201 Data Interchange on 90 mm Optical Disk Cartridges Capacity: 230 Megabytes per Cartridge pp. 41, 43, 44, 47 and 48.

(Continued)

*Primary Examiner*—Ali Neyzari
(74) *Attorney, Agent, or Firm*—Birch, Stewart, Kolasch & Birch, LLP

(57) ABSTRACT

In a method for setting variable areas of an optical disc which variably sets spare area rates of a prescribed quantity provided for preparing a liably-occurring recording error due to a defect of the optical disc having the variable spare areas, the total quantity of the spare areas installed to the optical disc may be the same as the prescribed quantity. Also, the size rates of the spare areas are variably set in the radius direction by centering about a center portion of the optical disc. Particularly, the more spare area rates are given to the inner circumferential portion and outer circumferential portion, and the less spare area rates are given to the center portion which is relatively stable portion, thereby minimizing the defect occurring rate to decrease the number of defective discs.

20 Claims, 3 Drawing Sheets

U.S. PATENT DOCUMENTS

| | | |
|---|---|---|
| 6,469,978 B1 | 10/2002 | Ohata et al. |
| 6,510,114 B1 * | 1/2003 | Yeo et al. .................. 369/53.2 |
| 6,654,330 B1 * | 11/2003 | Yeo et al. ................ 369/53.29 |
| 6,690,634 B1 * | 2/2004 | Yeo et al. ................ 369/53.29 |
| 6,714,497 B1 * | 3/2004 | Yeo et al. .................. 369/53.2 |

FOREIGN PATENT DOCUMENTS

| | | |
|---|---|---|
| EP | 0798712 | 10/1997 |
| EP | 0798714 | 10/1997 |
| EP | 0813189 | 12/1997 |
| GB | 2326015 | 12/1998 |
| JP | 62209776 | 9/1987 |
| JP | 2156477 | 6/1990 |
| JP | 8124304 | 5/1996 |
| WO | WO 9630902 | 10/1996 |

OTHER PUBLICATIONS

Standard ECMA-272 120 mm DVD rewritable Disk (DVD-RAM) pp. 41, 42.

* cited by examiner

OPTICAL DISC HAVING VARIABLE SPARE AREA RATES AND METHOD FOR VARIABLY SETTING THE RATE OF SPARE AREAS IN THE OPTICAL DISC

This application is a continuation of co-pending application Ser. No. 09/055,240, filed on Apr. 6, 1998 (now allowed), and for which priority is claimed under 35 U.S.C. § 120; and this application claims priority of Application No. 19695/1997 filed in Republic of Korea on May 21, 1997 under 35 U.S.C. § 119; the entire contents of all are hereby incorporated by reference.

BACKGROUND OF THE INVENTION

1. Field of the Invention

The present invention relates to an optical disc having spare areas and a method therefor, and more particularly to a method for variable setting the rate of spare areas of an optical disc and an optical disc provided with the variable spare area rates.

2. Description of the Background Art

The recent development of the information industry increases the need for techniques capable of recording information of high density and large quantity. Especially, by entering the multimedia era, a remarkably rapid technical development has been achieved in recording optical media such as a compact disc (CD) and a digital versatile disc (DVD).

Along with such development and along with a demand for a recording medium of large capacity, optical recording media have become more popular than magnetic media. However, in employing the optical recording system, reliability of the recording substance of the optical disc, which is the recording medium, is inferior to the reliability of the magnetic disc. Techniques for compensating and/or correcting the inferior reliability have therefore been utilized using an error correction code, spare areas and so on.

Spare areas are set by portions in the recording area (i.e., a main area for storing a digital data) of the optical disc, which are not used during the normal recording condition. The spare areas are furnished for the purpose of providing a corresponding spare area that is equivalent to an area of the optical disc that is damaged and thus inoperative to permit the optical disc to normally function as the recording medium on the whole.

That is, the spare area is employed to prepare against damage to the recording area. Spare areas may be arranged at specific places of the optical disc or distributably arranged throughout respective portions within the disc. However, since the spare areas arranged to specific places of the optical disc induce unnecessary movement of the head during reading out and recording data, it is preferable that the spare areas are divided and distributably arranged throughout respective portions within the disc. Also, the recording areas of a recordable optical disc are set by employing a Zoned Constant Linear Velocity (ZCLV) system.

A general format of the above-stated optical disc is illustrated in FIG. 1. Referring to the optical disc 10 shown in FIG. 1, a reference numeral 1 denotes a radius of the disc; 2 is an inner radius of the disc; 3 is a recording area of the disc in which data is stored; 4 are zones divided into a plurality of partitioned areas in the diameter direction; and 5 are sectors divided in the circumferential direction within zones 4. Not shown in FIG. 1 are a plurality of tracks forming a concentric circle within zone 4.

The tracks, sectors 5 and zones 4 are respectively provided with independent addresses for easily reading out the recorded information, which facilitates the access to desired information by managing the file name of the recorded information and address with respect to the recorded position in accordance with a File Allocation Table (FAT).

In case of initializing the optical disc, the recording area is partitioned into 24 successive zones, and respective spare areas are allotted to zones 4. Because the foregoing spare areas are arranged within respective zones, the information to be recorded onto a portion that probably involves the faulty recording within the zone is recorded on the spare area within the corresponding zone to prevent the defect. The size of the spare area is adjustable. Thus, when the size is increased, the reliability of the disc is increased while the recording capacity is reduced relatively.

Therefore, the spare areas are allocated by a prescribed rate in accordance with the size (number of blocks) of the recording area within respective zones, and the size occupies approximately 5.37% which is the prescribed rate of the capacity of zones 4. The sizes of the spare areas per zone are indicated in the following <Table 1>.

TABLE 1

| Zone | Size of Recording Area (No. of blocks) | Size of Spare Area (No. of blocks) | Rate (%) |
|---|---|---|---|
| 0 | 1901 | 102 | 5.37% |
| 1 | 2010 | 108 | 5.37% |
| 2 | 2122 | 114 | 5.37% |
| 3 | 2234 | 120 | 5.37% |
| 4 | 2346 | 126 | 5.37% |
| 5 | 2458 | 132 | 5.37% |
| 6 | 2570 | 138 | 5.37% |
| 7 | 2682 | 144 | 5.37% |
| 8 | 2792 | 150 | 5.37% |
| 9 | 2904 | 156 | 5.37% |
| 10 | 3016 | 162 | 5.37% |
| 11 | 3128 | 168 | 5.37% |
| 12 | 3240 | 174 | 5.37% |
| 13 | 3352 | 180 | 5.37% |
| 14 | 3464 | 186 | 5.37% |
| 15 | 3576 | 192 | 5.37% |
| 16 | 3686 | 198 | 5.37% |
| 17 | 3798 | 204 | 5.37% |
| 18 | 3910 | 210 | 5.37% |
| 19 | 4022 | 216 | 5.37% |
| 20 | 4134 | 222 | 5.37% |
| 21 | 4246 | 228 | 5.37% |
| 22 | 4358 | 234 | 5.37% |
| 23 | 4475 | 240 | 5.37% |
| Total | 76424 | 4104 | 5.37% |

<Table 1> is obtained by recording the spare areas produced from the DVD standard regulations.

The recording layer of the aforementioned optical disc is typically fabricated via a sputtering method which is widely used as one major technique of forming a this film. Here, it is required that the recording layer of the optical disc fabricated at this time has a characteristic of being consistent throughout the recording area. Accordingly, in order to uniformly maintain the quality of the optical disc, the certainty of such consistency becomes the important requisite.

FIG. 2 is a view showing a mean thickness distribution of the recording layer of the optical disc. As shown in FIG. 2, the center portion of the recording area has the relatively consistent thickness, but the portions adjacent to the inner circumferential portion or adjacent to the outer circumferential portion of the disc have the varied thickness. FIG. 2 also shows how the spare area rate remains constant along the radial direction of a conventional disc, as described above with respect to <Table 1>.

Furthermore during the injection molding for fabricating a substrate of the optical disc, which is formed of a plastic, the inner diameter portion and outer diameter portion of the disc are optically inconsistent due to the differences in resin temperature, cooling time, etc. The deviations of the recording characteristics incited due to the inconsistent substrate and varied thickness of the recording layer currently satisfy the stipulated standard of using the disc, which, however, are required to be improved in the aspect of reliability.

Therefore, many attempts have previously been made to achieve the desired consistency. Nevertheless, the thickness variation of the recording layer shows a deviation of ±2% currently. Additionally, it is a general point of view that the inconsistency is difficult to be completely eliminated.

As described above, the optical disc allots the spare areas of the prescribed rate (approximately 5.7%) with respect to overall zone capacity in setting the recording area. As described with reference to FIG. 2, the optical disc has inconsistent thickness throughout resulting from the varied thickness in the lengthwise direction of the radius. Consequently, since the defect occurring rates at specific points of the optical disc differ from one another, a specific zone cannot be used further if the defect within the corresponding zone is increased to employ all replaceable spare areas. For this reason, the overall disc may not be used without experiencing reduced reliability due to the increase of the defective portions.

SUMMARY OF THE INVENTION

Therefore, it is an object of the present invention to provide a method for variably setting the rate of spare areas in an optical disc, wherein, in order to solve the above-enumerated problems, the rates of spare area arranged within the optical disc are variably set.

It is another object of the present invention to provide an optical disc having variable spare area.

To achieve the above and other objects of the present invention, there is provided an optical disc comprising a main area for storing digital data, the main area being divided with a plurality of zones; and a spare area having a variable area rate within the each zone of the main area, for storing the corresponding digital data instead of the main area to prepare an occurring data error due to a defect of the main area.

Also, according to an aspect of the present invention, there is a method for setting spare areas of an optical disc for preparing a liably-occurring recording error due to a defect of said optical disc, wherein the method for setting the spare areas of the optical disc is preformed by variably setting the spare area rates of which size rates are variably set in the radius direction of the optical disc.

In the optical disc formed according to an aspect of the present invention in view of the above construction, the spare area rates provided for respective zones are not constantly allotted per zone, but are variably provided per zone to enable to deal with a liably-occurring defect in accordance with the thickness variation of the disc, thereby improving overall reliability of the disc.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

Figure 1:
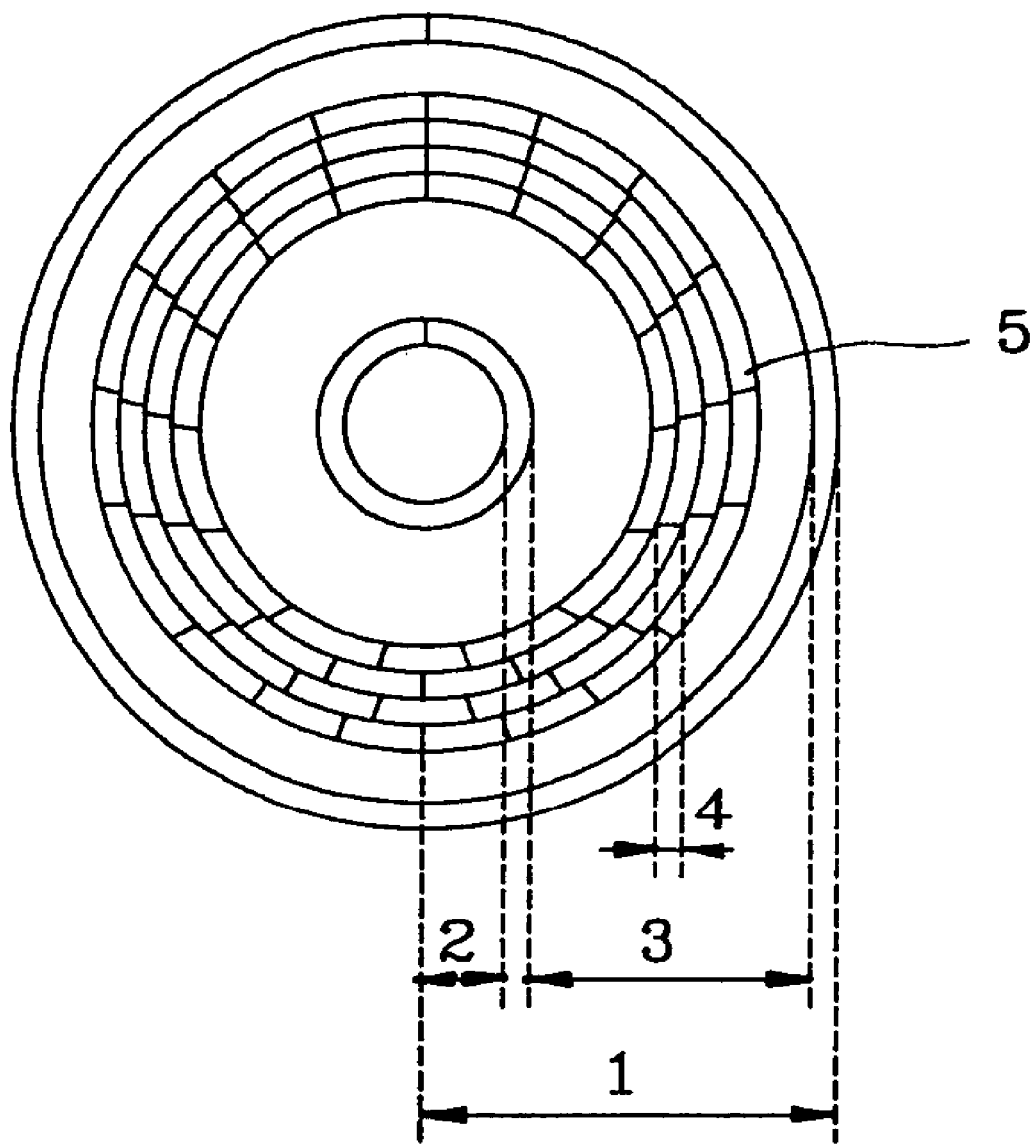
FIG. 1 is a view showing a format of a conventional optical disc.
Figure 2:
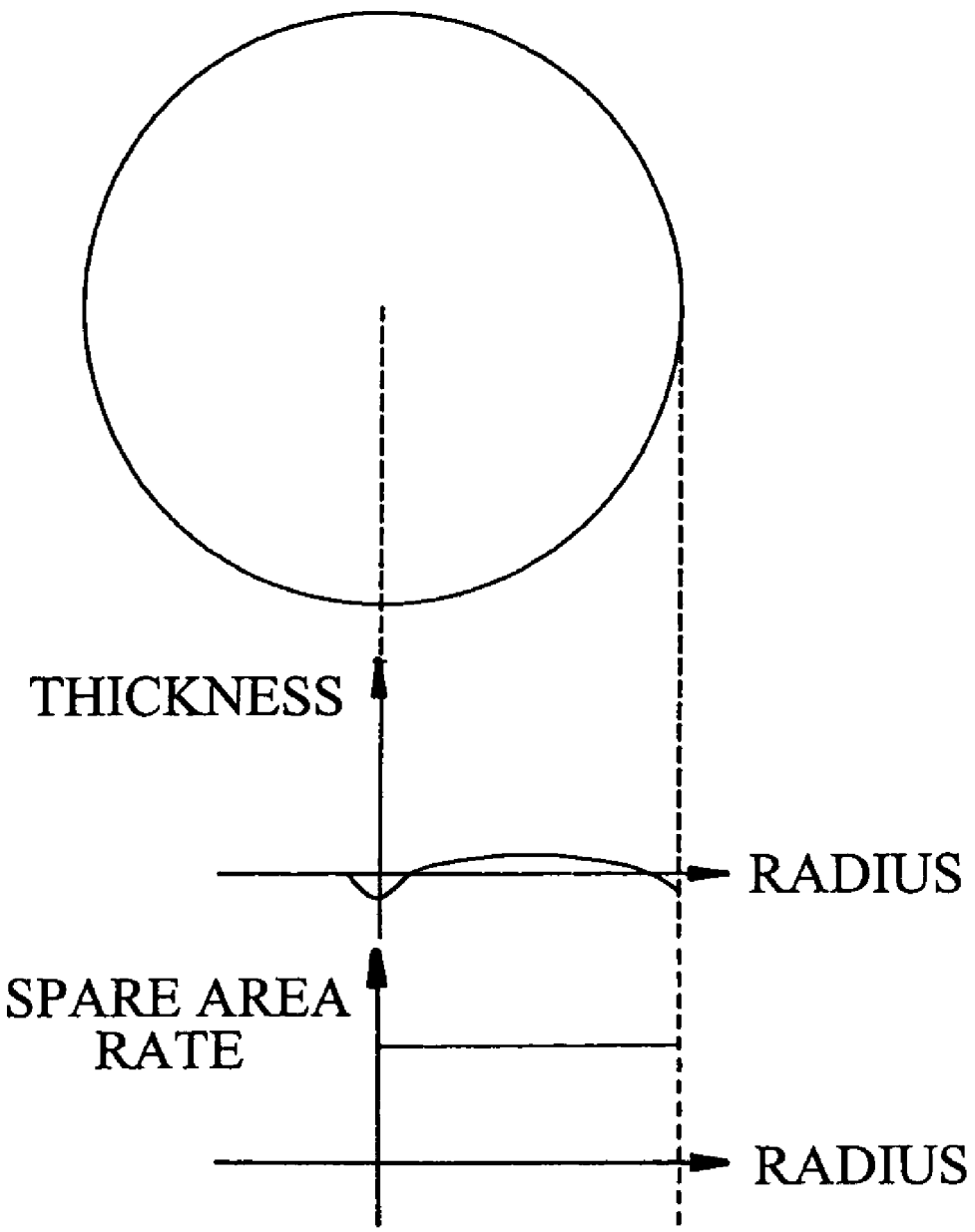
FIG. 2 is a view showing variations in thickness and spare area rate in the radial direction of a conventional optical disc.
Figure 3:
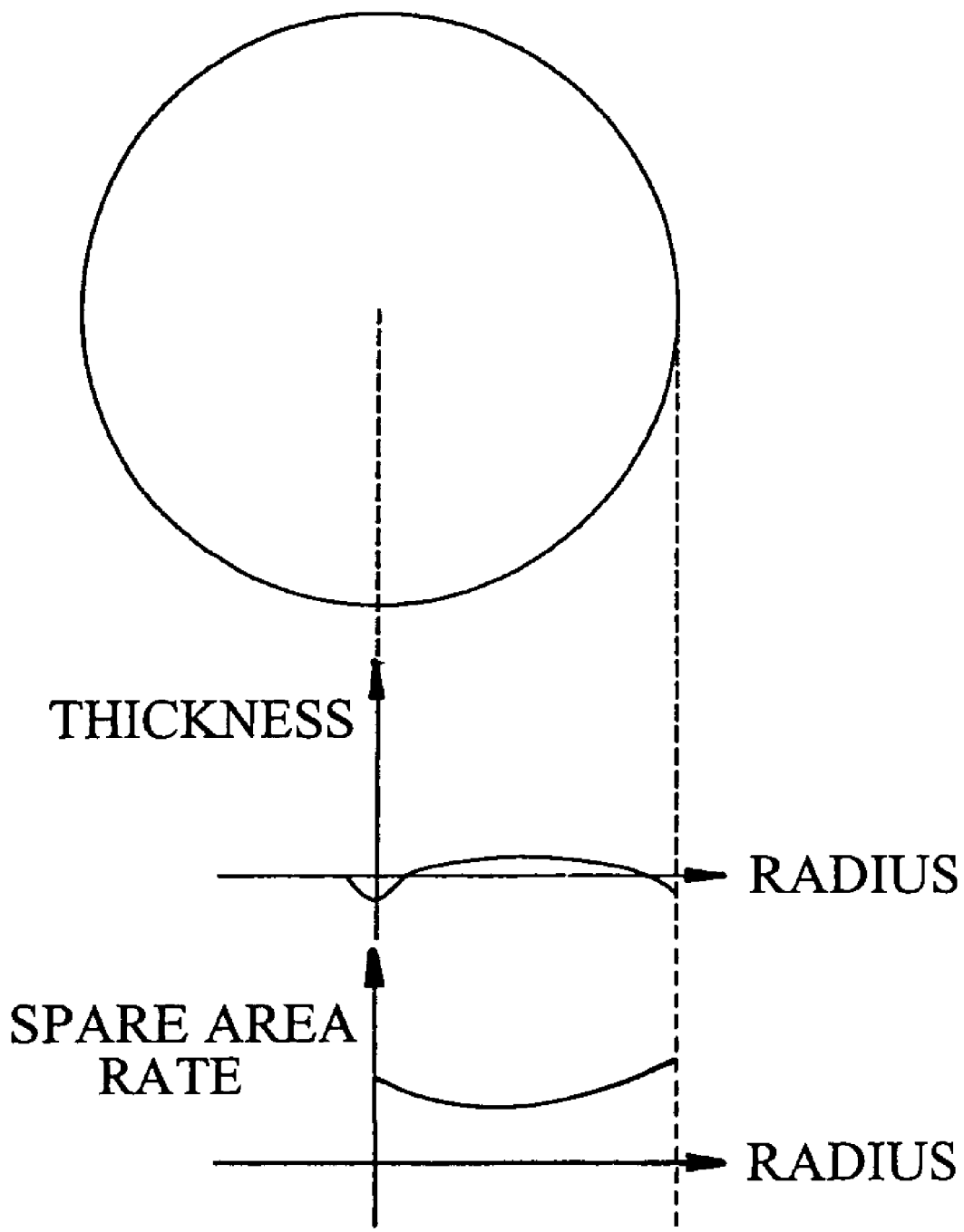
FIG. 3 is a view showing variations in thickness and spare area rate in the radial direction of an optical disc according to an embodiment of the present invention.

When arranging the rates of spare areas in the present invention, the total quantity of the spare areas during fabrication of an optical disc according to the present invention is set to be identical to that of the optical disc that has the typical spare areas. Also, in arranging the spare areas, it is constructed such that the sizes of the spare areas arranged onto the inner circumferential portion or outer circumferential portion are relatively larger than those of the spare areas arranged onto the center portion by considering the above-mentioned thickness characteristics of the recording layer of the optical disc, as shown in FIG. 3. In the present invention, the term "spare area rate" means the rate of a spare area to a zone area.

However, the present invention is not limited to the above-described embodiment, but can be applied to the optical disc that does not have the typical spare areas.

A fabricating method of the optical disc is largely performed by steps of forming a stamper, of injection-molding a transparent substrate having a thickness of about 0.6 mm by using the prepared stamper, of covering a recording layer over the molded transparent substrate by using a continuous-type sputter, and of adhering the disc formed with the recording layers. The detailed steps are of the well-known in the art, of which detailed descriptions will thus be omitted.

For the purpose of examining the reliabilities of the optical disc having the variable rates of spare areas according to the present invention and the optical disc having the conventional fixed spare areas as presented in <Table 1>, a comparative example having the rate based on <Table 1> is compared with the first and second embodiments of the present invention having the rates resulting respectively from <Table 2> and <Table 3> to be described later, thereby being tested.

The fabrication of the optical disc according to the first embodiment of the present invention is identical to that of the optical disc of the conventional technique which is to be the comparative object until forming the recording layer.

In other words, a widely-used mastering facility of Sony Co. may be employed for fabricating the stamper, and the transparent substrate having the thickness of about 0.6 mm is injection-molded by using the fabricated stamper. At this time, a molder of Meiki Mfg. (Japan) is employed while using polycarbonate (product of GE). The molded transparent substrate is covered with the recording layer by using the continuous-type sputter of Jinko Co. of Japan.

Then, the spare areas occupying a predetermined rate of the capacity (number of blocks is 76424) of the total zone (23) of the optical disc, fabricated as above, are formed. The optical disc having the spare areas stated in <Table 1> is prepared as the comparative example. That is, it is installed in a manner that the rate of the spare areas is to be 5.37% (number of blocks is 4104), and the rate of the spare area with respect to each zone capacity is to be 5.37%.

Also, in the first embodiment of the present invention, the total zone capacity and rate of the spare area of the optical disc fabricated as above are identically installed. Except that, it is arranged such that the spare rates with respect to the sizes of the recording area within the respective zones have the rate as shown in <Table 2> below.

TABLE 2

| Zone | Size of Recording Area (No. of blocks) | Size of Spare Area (No. of blocks) | Rates (%) |
|---|---|---|---|
| 0 | 1901 | 204 | 10.73% |
| 1 | 2010 | 216 | 10.75% |
| 2 | 2122 | 171 | 8.06% |
| 3 | 2234 | 180 | 8.06% |
| 4 | 2346 | 126 | 5.37% |
| 5 | 2458 | 132 | 5.37% |
| 6 | 2570 | 69 | 2.68% |
| 7 | 2682 | 72 | 2.68% |
| 8 | 2792 | 75 | 2.69% |
| 9 | 2904 | 78 | 2.69% |
| 10 | 3016 | 81 | 2.69% |
| 11 | 3128 | 84 | 2.69% |
| 12 | 3240 | 87 | 2.69% |
| 13 | 3352 | 90 | 2.68% |
| 14 | 3464 | 93 | 2.68% |
| 15 | 3576 | 96 | 2.68% |
| 16 | 3686 | 99 | 2.69% |
| 17 | 3798 | 102 | 2.69% |
| 18 | 3910 | 210 | 5.37% |
| 19 | 4022 | 216 | 5.37% |
| 20 | 4134 | 333 | 8.06% |
| 21 | 4246 | 342 | 8.05% |
| 22 | 4358 | 468 | 10.74% |
| 23 | 4475 | 480 | 10.73% |
| Total | 76424 | 4104 | 5.37% |

That is, it is changed such that zone 0 is to 10.73%, zone 1 is to 10.75%, zones 2 and 3 are to 8.06%, zones 4 and 5 are to 5.37%, zones 6 and 7 are to 2.68%, zones 8 to 12 are to 2.69%, zones 13 to 15 are to 2.68%, zones 16 and 17 are to 2.69%, zones 18 and 19 are to 5.37%, zone 20 is to 8.06%, zone 21 is to 8.05%, zone 22 is to 10.74%, and zone 23 is to 10.73%. Here, the total mean rate is to be approximately 5.37%.

The second embodiment of the present invention is fabricated in the identical manner to the aforementioned comparative example and first embodiment. In other words, the rate with respect to the capacity of the total zone of the optical disc is identical by 5.37%, but the size rates of the spare areas with respect to the respective zone sizes are to be as shown in <Table 3> below.

TABLE 3

| Zone | Size of Recording Area (No. of blocks) | Size of Spare Area (No. of blocks) | Rates (%) |
|---|---|---|---|
| 0 | 1901 | 153 | 8.05% |
| 1 | 2010 | 162 | 8.06% |
| 2 | 2122 | 171 | 8.06% |

TABLE 3-continued

| Zone | Size of Recording Area (No. of blocks) | Size of Spare Area (No. of blocks) | Rates (%) |
|---|---|---|---|
| 3 | 2234 | 180 | 8.06% |
| 4 | 2346 | 126 | 5.37% |
| 5 | 2458 | 132 | 5.37% |
| 6 | 2570 | 69 | 2.68% |
| 7 | 2682 | 72 | 2.68% |
| 8 | 2792 | 75 | 2.69% |
| 9 | 2904 | 78 | 2.69% |
| 10 | 3016 | 81 | 2.69% |
| 11 | 3128 | 84 | 2.69% |
| 12 | 3240 | 87 | 2.69% |
| 13 | 3352 | 90 | 2.68% |
| 14 | 3464 | 93 | 2.68% |
| 15 | 3576 | 96 | 2.68% |
| 16 | 3686 | 198 | 5.37% |
| 17 | 3798 | 204 | 5.37% |
| 18 | 3910 | 210 | 5.37% |
| 19 | 4022 | 324 | 8.06% |
| 20 | 4134 | 333 | 8.06% |
| 21 | 4246 | 342 | 8.05% |
| 22 | 4358 | 351 | 8.05% |
| 23 | 4475 | 390 | 8.72% |
| Total | 76424 | 4101 | 5.37% |

In the foregoing first and second embodiments, the overall size of the spare areas is unchanged to prevent the recording capacity of the optical disc from being degraded. The optical discs of three kinds of the comparative example, first and second embodiments are prepared by as many as 20 sheets for each to test the reliability.

The reliability test is executed for observing and measuring the defect of the disc after exposing the disc to severe surroundings. For instance, the severe surroundings are such that respective optical discs are exposed for 15 days under the condition of a temperature of 60° C. and a relative humidity of about 90%. After exposing to the external environment, they are left intact for 24 hours at the normal temperature, and then measured.

That is, the defective extent of the discs at respective discs is measured to compare the spare areas provided to respective zones, so that the number of discs (defective discs) depleting all spare areas is evaluated. As the result, in this test, five defective discs are detected from the comparative example while no detective disc is detected from the first and second embodiments of the present invention.

In view of the result of studying the state of the above-mentioned defective discs, the defects mostly occur at the zones of inner circumference and outer circumference sides of the discs. When the defect is excessive, all preset spare areas are depleted to be decided as the defective disc.

In consideration of the first and second embodiments of the present invention, the defect occurs similarly to the comparative example. But relatively large spare areas are installed to the inner circumferential portion and outer circumferential portion of the optical disc as stated in foregoing <Table 1> and <Table 2>. Thus, the defect occurring rate is low.

In the optical disc fabricated by the method for setting the spare areas of the optical disc according to the present invention, the rate of the spare areas of respective zones are adjusted without changing the overall size and distribution of the spare areas within the zones of the rewritable optical disc. In other words, more spare areas are installed to the inner circumferential and outer circumferential portions of the optical disc, and less spare areas are installed to the center portion which is the relative stable portion of the optical disc. As a result, the defect rate is minimized to be able to decrease the number of defective discs. By doing so, the reliability of the optical disc is heightened, and the problem resulting from the inconsistency of the optical disc can be solved.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A method for setting spare areas of an optical medium, the method comprising:
    configuring a recording area including at least two zones that are located at different sides from a substantially central radial position on the optical medium, the at least two zones including first and second zones, the first zone being located at an inner side on the optical medium and the second zone being located at an outer side on the optical medium; and
    setting each of the at least two zones into a spare area and a main area,
    wherein a ratio of the size of the spare area to the size of the main area in the second zone is larger than a ratio of the size of the spare area to the size of the main area in the first zone.

2. The method of claim 1, wherein the first zone is the most inner zone on the optical medium, and the second zone is the most outer zone on the optical medium.

3. The method of claim 1, wherein ratios of spare area size to main area size for the at least two zones decrease and then increase from an inner to outer radial direction.

4. The method of claim 1, wherein the at least two zones are successively allocated in a radial direction on the optical medium.

5. The method of claim 1, wherein the size of the spare area and the size of the main area are represented in a number of blocks.

6. The method of claim 1, wherein a ratio of a total spare area size to a total main area size for all the at least two zones is approximately 5.37%.

7. A method for organizing spare areas of an optical disc, the method comprising:
    configuring a recording area including at least two zones on the optical disc; and
    organizing each of the at least two zones into a spare area and a main area,
    wherein ratios of spare area size to main area size for the at least two zones decrease from an outer to inner radial direction.

8. The method of claim 7, wherein the at least two zones are successively allocated in a radial direction on the optical disc.

9. The method of claim 7, wherein the spare area size and the main area size are represented in a number of blocks.

10. The method of claim 7, wherein a ratio of a total spare area size to a total main area size for all the at least two zones is approximately 5.37%.

11. A method for organizing spare areas of an optical disc, the method comprising:
    configuring a recording area including at least two zones on the optical disc; and
    organizing each of the at least two zones into a spare area and a main area,
    wherein ratios of spare area size to main area size in the at least two zones decrease from an inner to outer radial direction.

12. The method of claim 11, wherein the at least two zones are successively allocated in a radial direction on the optical disc.

13. The method of claim 11, wherein the spare area size and the main area size are represented in a number of blocks.

14. The method of claim 11, wherein a ratio of a total spare area size to a total main area size for all the at least two zones is approximately 5.37%.

15. An optical medium comprising:
    a recording area including at least two zones that are located at different sides from a substantially central radial position, the at least two zones including first and second zones, the first zone being located at an inner side on the optical medium, the second zone being located at an outer side on the optical medium, each of the at least two zones including a spare area and a main area,
    wherein a ratio of the size of the spare area to the size of the main area in the second zone is larger than a ratio of the size of the spare area to the size of the main area in the first zone.

16. The optical medium of claim 15, wherein the first zone is the most inner zone on the optical medium, and the second zone is the most outer zone on the optical medium.

17. The optical medium of claim 15, wherein ratios of spare area size to main area size for the at least two zones decrease and then increase from an inner to outer radial direction.

18. The optical medium of claim 15, wherein a ratio of a total spare area size to a total main area size for all the at least two zones is approximately 5.37%.

19. An optical disc comprising:
    a recording area including at least two zones, each of the at least two zones including a spare area and a main area,
    wherein ratios of spare area size to main area size for the at least two zones decrease from an outer to inner radial direction.

20. The optical disc of claim 19, wherein the at least two zones are successively allocated in a radial direction.

* * * * *